US008068252B2

(12) United States Patent
Lange et al.

(10) Patent No.: US 8,068,252 B2

(45) Date of Patent: Nov. 29, 2011

(54) PRINTING SYSTEM AND METHOD INCLUDING ACTIVE AND INACTIVE IMAGE MARKING ENGINES

(75) Inventors: Clark Vaughn Lange, Ontario, NY (US); Steven Robert Moore, Pittsford, NY (US); Dusan G. Lysy, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 988 days.

(21) Appl. No.: 11/956,637

(22) Filed: Dec. 14, 2007

(65) Prior Publication Data

US 2009/0153884 A1 Jun. 18, 2009

(51) Int. Cl.
*G06F 15/00* (2006.01)

(52) U.S. Cl. .......................................... 358/1.4; 358/1.1

(58) Field of Classification Search .................. 358/1.1, 358/1.4, 400, 401, 296, 500, 501

See application file for complete search history.

(56) References Cited

U.S. PATENT DOCUMENTS 5,859,711 A * 1/1999 Barry et al. .................. 358/296
5,963,770 A * 10/1999 Eakin ............................ 399/364
2006/0221159 A1 10/2006 Moore et al.
2006/0291018 A1 * 12/2006 Lang et al. .................... 358/540

* cited by examiner

*Primary Examiner* — Thomas D Lee

(74) *Attorney, Agent, or Firm* — Fay Sharpe LLP

(57) ABSTRACT

This disclosure provides a printing method and system including two or more integrated image marking engines, wherein the printing system is operated with less than the total number of image marking engines to generate the maximum specified prints per minute associated with the printing system. According to one exemplary embodiment, each image marking engine is controlled to be inactive in a round-robin manner to maintain substantially equal running time on each image marking engine or a substantially equal number of printed sheets on each marking engine.

22 Claims, 4 Drawing Sheets

PRINTING SYSTEM AND METHOD INCLUDING ACTIVE AND INACTIVE IMAGE MARKING ENGINES

BACKGROUND

The present disclosure relates to printing systems which include two or more integrated printing apparatuses and/or image marking engines ("IME").

One example of an integrated printing system is disclosed in U.S. patent application number US 2006/0221159 which provides two or more IMEs which are integrated by means of a media highway. The media highway integrates the IMEs to provide transportation of a marking substrate to each IME for image marking. Notably, IMEs may be integrated horizontally, vertically, or horizontally and vertically.

Conventionally, the number of marking engines integrated within a specific printing system is chosen to satisfy a desired print rate. For example, a printing system designed to produce a maximum page rate of 100 ppm could include 4 IMEs, each capable of 25 ppm. Alternatively, the printing system could include 5 IMEs, each capable of 20 ppm.

One disadvantage associated with these conventional integrated printing systems is they only provide partial productivity when one or more of the IMEs is unable to operate for technical or service related issues.

For example, for a 4 IME system with an advertised productivity of 100 ppm (i.e. each IME producing 25 ppm), a maximum productivity of 75 ppm is attainable with 1 IME out of service. This variance in productivity from the advertised or specified throughput of the printing system may contribute to user dissatisfaction.

This disclosure provides a method and system to maintain a specified or advertised printing system throughput, while providing for the removal/disablement of one or more IMEs from the system.

INCORPORATION BY REFERENCE

U.S. patent publication No. 2006/0221159 by Moore et al., published on Oct. 5, 2006, entitled "PARALLEL PRINTING ARCHITECTURE WITH PARALLEL HORIZONTAL PRINTING MODULES," is totally incorporated herein by reference.

BRIEF DESCRIPTION

In one aspect of this disclosure, a method of operating a printing system is disclosed. The printing system comprises two or more integrated image marking engines and the method comprises operating the printing system with less than the total number of image marking engines (IMEs) to generate the maximum specified prints per minute (ppm) associated with the printing system, each image marking engine being controlled to be active and inactive for a predetermined duty cycle, where the duty cycle associated with each of the said two or more integrated image marking engines is substantially equal.

In another aspect of this disclosure, a printing system is disclosed. The printing system comprises two or more integrated image marking engines; and a controller, wherein the controller is configured to execute a method comprising operating the printing system with less than the total number of image marking engines (IMEs) to generate the maximum specified prints per minute (ppm) associated with the printing system, each image marking engine being controlled to be active and inactive for a predetermined duty cycle, where the duty cycle associated with each of the said two or more integrated image marking engines is substantially equal.

In another aspect of this disclosure, a xerographic imaging system is disclosed. The xerographic imaging system comprises two or more image marking engines; a media sheet feeder module; a media sheet stacker module; one or more media path highways operatively connected to the two or more image marking engines, the media sheet feeder module and the media sheet stacker module; and a controller, wherein the controller is configured to execute a method comprising operating the printing system with less than the total number of image marking engines (IMEs) to generate the maximum specified prints per minute (ppm) associated with the printing system, each image marking engine being controlled to be active and inactive for a predetermined duty cycle, where the duty cycle associated with each of the said two or more integrated image marking engines is substantially equal.

DETAILED DESCRIPTION

As briefly discussed in the Background section, this disclosure provides a method and system to maintain an advertised or specified throughput associated with an integrated printing system in the event one or more of the integrated IMEs is removed from the system or off-line for any reason. The disclosed integrated printing method and system utilizes one or more extra IMEs which can operate to maintain the overall printing system throughput requirements.

For example, in a 4 engine printing system, assume each IME is capable of operating at 33.3 ppm and the printing system is specified to have a maximum throughput of 100 ppm (i.e. the printing system is advertised to the user/customer as having a throughput of 100 ppm). To provide 100 ppm, 3 IMEs are active and operated at 33.3 ppm, and 1 IME is off-line and inactive. In the event an active IME fails or is removed from the printing system, the inactive IME is brought on-line and enables the printing system to maintain 100 ppm.

Notably, the example provided above is only one method, according to this disclosure, of operating a printing system with excess IMEs integrated within the printing system to maintain a required printing throughput. Another method of operating the "spare" or "excess" IME includes operation of the IMEs in a round-robin fashion, where the printing system runs three IMEs at 33.3 ppm and cyclically inactivates each of the four IMEs for a predetermined period of time. Alternatively, the printing system may inactivate each of the four IMEs after the printing system marks a predetermined number of sheets. The round-robin method provides more consistent aging of the IMEs which provides more consistent image marking quality between the IMEs.

Figure 1:
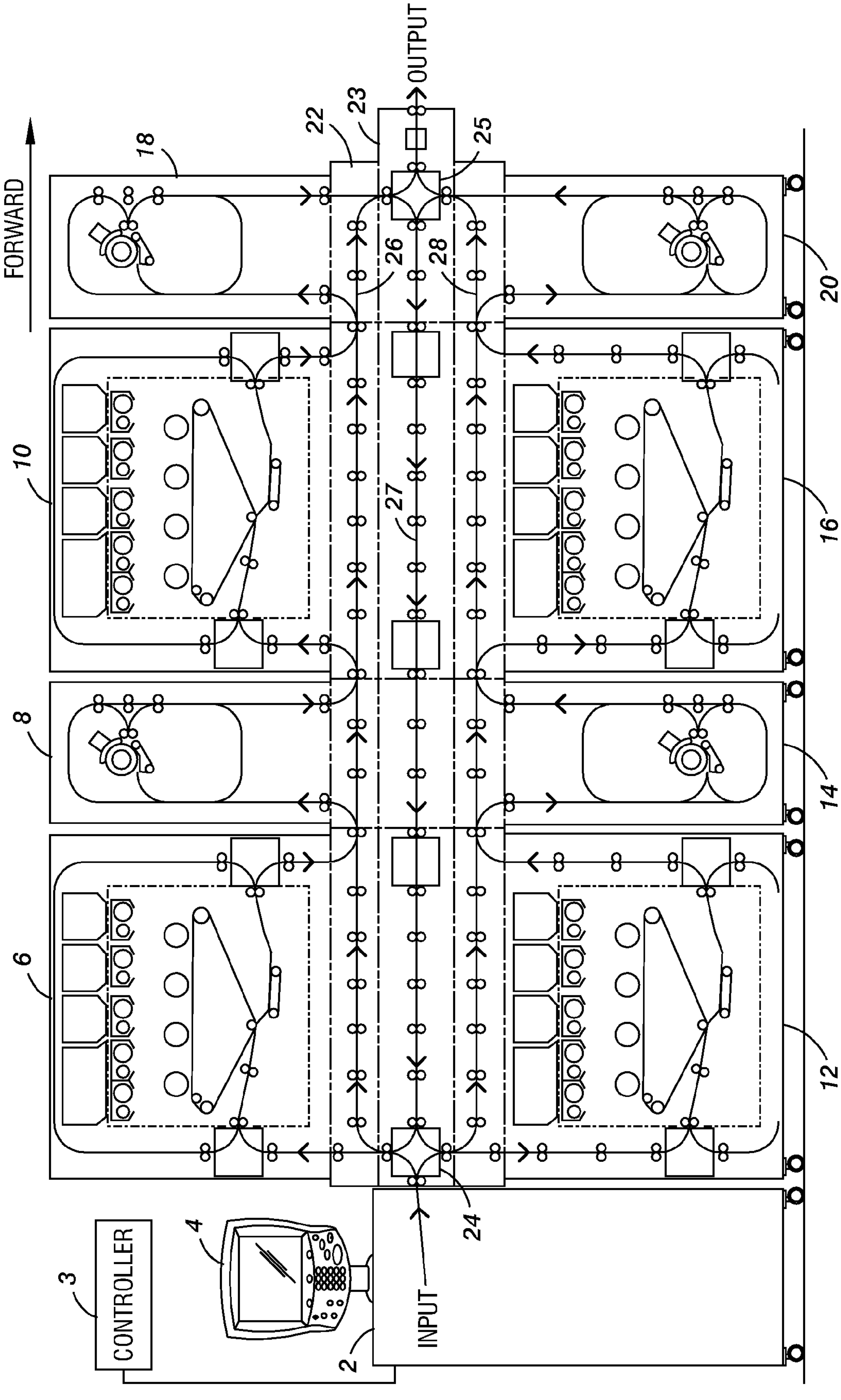
FIG. 1 schematically illustrates a printing system according to one exemplary embodiment of this disclosure.

With reference to FIG. 1, schematically illustrated is a printing system according to one exemplary embodiment of this disclosure. The printing system includes an interface module 2, a system controller 3, a user interface 4, a first upper IME 6, a first upper fuser module 8, a second upper IME 10, a second upper fuser module 18, a first lower IME 12, a first lower fuser module 14, a second lower IME 16, a second lower fuser module 20, a media sheet transport module 22 and an image sensor 23.

To facilitate the routing of media sheets from the sheet feeder module 2 to IMEs 6, 10, 12, and 16, fuser modules 8, 18, 14 and 20, and image sensor 23, transport module 22 includes an upper horizontal transport 26 which operates in the forward direction, a middle horizontal transport 27 which operates in the reverse direction, a lower horizontal transport 28 which operates in the forward direction, a first intersection transport 24 and a second intersection transport 25. In addition, transport module 22 provides routing of media sheets between any of the IMEs and fusing modules illustrated.

As will become apparent from the detailed description which follows, the method and system for operating a printing system according to this disclosure, and claims which follow, are not limited to the printing system illustrated in FIG. 1. For example, the printing system may include additional printing components such as a sheet feeder module, a finisher module, and alternative arrangements for integrating IMEs and other printing system devices. Moreover, the printing system may not include fuser modules or an interface module as illustrated in FIG. 1. Furthermore, one or more printing system devices, such as the media sheet transport 22 may be an integral part of the IMEs.

Figure 2:
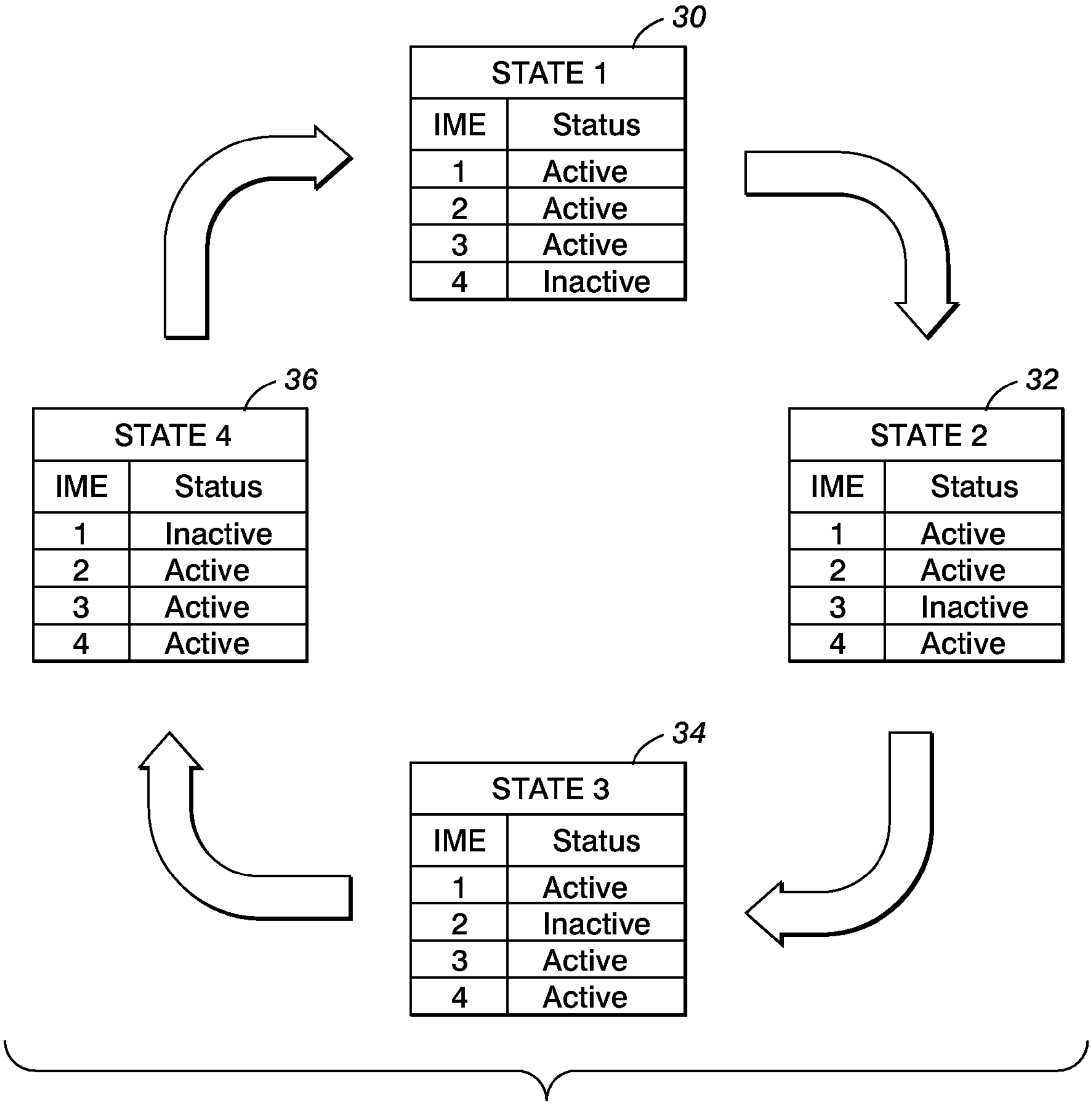
FIG. 2 schematically illustrates the sequencing states associated with a printing system according to one exemplary embodiment of this disclosure.

With reference to FIG. 2, illustrated are the sequencing states of the exemplary printing system shown in FIG. 1. Sequencing state 1 (30), state 2 (32), state 3 (34) and state 4 (36) are executed by controller 3 which operatively controls the routing of media sheets, and the overall sequencing of IMEs 6, 10, 12 and 16 for a particular printing job.

Substantially, the method of sequencing the IMEs illustrated in FIG. 2 is a round-robin methodology where three out of four IMEs are active at any particular time, while one of the four IMEs is inactive. With this round-robin approach, each of the four IMEs is sequentially inactivated for a predetermined time, a predetermined number of printing cycles, or some other predetermined performance criteria associated with the printing system. This approach provides approximate equal running or printing time for each of IMEs 6, 10, 12 and 16 which contributes to overall image quality consistency.

For example, with continuing reference to FIG. 2, the first sequential state 30 executed by the printing system activates IMEs 1, 2 and 3 associated with IMEs 6, 10 and 12 illustrated in FIG. 1. IME 4, associated with IME 16 illustrated in FIG. 1, is inactivated by controller 3. The controller maintains state 1 (30) for a predetermined time duration before proceeding to the second sequential state 32. According to one exemplary embodiment, the predetermined time duration is approximately 8 hours. However, the predetermined time duration or cycle time is not limited to 8 hours and can be any practical time duration set by a user. Alternatively, the duty cycle of a particular state can be related to a predetermined number of printed sheets.

After the predetermined cycle time, the controller sequences the printing system illustrated in FIG. 1 to the second sequential state 32. During the second sequential state 32, the controller 3 activates IMEs 1, 2 and 4 associated with IMEs 6, 10 and 16 illustrated in FIG. 1. IME 3, associated with IME 16 illustrated in FIG. 1, is inactivated by controller 3. As in the first sequential state, the controller maintains state 2 (32) for the predetermined time duration before processing to the third sequential state 34.

After the predetermined cycle time has elapsed, the controller sequences the printing system illustrated in FIG. 1 to the third sequential state 34.

During the third sequential state 34, the controller 3 activates IMEs 1, 3 and 4 associated with IMEs 6, 12 and 16 illustrated in FIG. 1. IME 2, associated with IME 10 illustrated in FIG. 1, is inactivated by controller 3. As in the first and second sequential states, the controller maintains state 3 (34) for the predetermined time duration before proceeding to the fourth sequential state 36.

After the predetermined cycle time has elapsed, the controller sequences the printing system illustrated in FIG. 1 to the fourth sequential state 36. During the fourth sequential state 36, the controller 3 activates IMEs 2, 3 and 4 associated with IMEs 10, 12 and 16 illustrated in FIG. 1. IME 1, associated with IME 6 illustrated in FIG. 1, is inactivated by controller 3. As in the first, second and third sequential states, the controller maintains state 3 (34) for the predetermined time duration before proceeding back to the first sequential state 30.

After the predetermined cycle time has elapsed, the controller sequences the printing system illustrated in FIG. 1 to the first sequential state 30 and the sequential state processing is repeated. In other words, the controller sequentially sequences the printing system from state 1 to state 2 to state 3 to state 4 as previously described.

This sequencing of printing system states may be continued for an indefinite time or may continue for a specific predetermined time specified by the user. Alternatively, the controller may determine a particular IME is in need of service and/or is producing a low quality print as measured by the image sensor 23 which necessitates the IME being inactivated until the condition is corrected.

In the event the controller inactivates an IME for an indefinite time for service, etc., the controller will terminate sequencing the printing system until the inactive IME is placed in service. For example, the controller can indefinitely execute state 2 (32) if IME 3 (12) is down.

Figure 3:
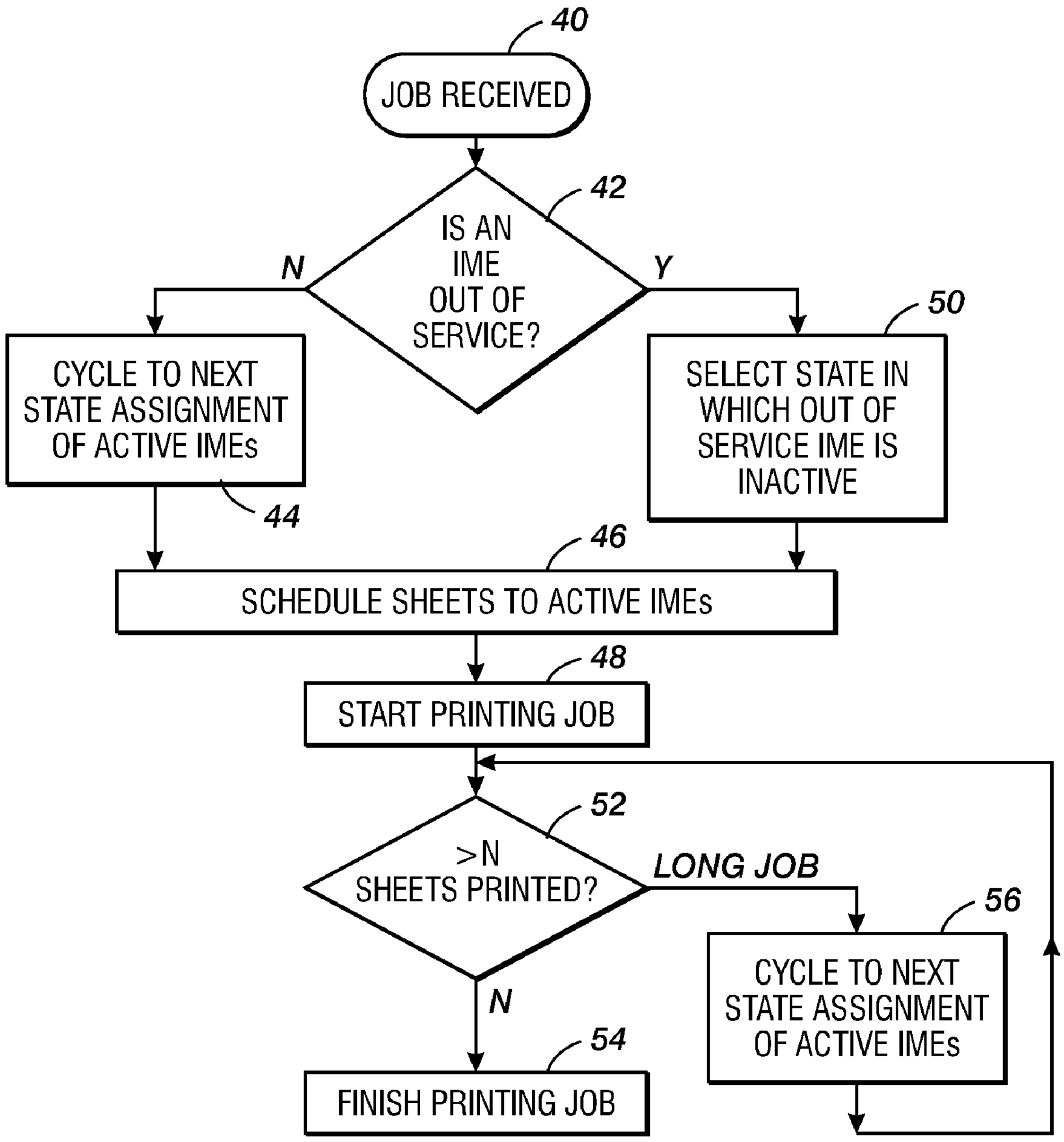
FIG. 3 is a flow chart illustrating an exemplary algorithm to control a printing system according to one exemplary embodiment of this disclosure.

With reference to FIG. 3, illustrated is a flow chart representative of an exemplary algorithm executed by the printing system illustrated in FIG. 1 to sequentially process the printing system through a series of sequential states as shown in FIG. 2. Furthermore, the algorithm illustrated is not limited to the printing system illustrated in FIG. 1 and is applicable to other printing systems which include two or more IMEs. For example, a 2 IME printing system a 3 IME printing system, a 5 IME printing system etc.

The executed algorithm operates as follows:

Initially a printing system controller receives a print job 40.

Next, the controller determines if an IME is out of service 42.

If an IME is out of service, the controller executes a printing system state where the respective IME is inactive 50.

Otherwise, if all IMEs are in service, the controller cycles to the next state assignment associated with the active IMEs 44.

At this point the controller schedules 46 media sheets to the active IMEs to initiate the received print job.

Next, the controller starts executing 48 the printing job based on the schedule generated in step 46.

Next, the controller determines 52 if the number of printed sheets has exceeded a predetermined number N. If the number of printed sheets has exceeded a predetermined number N, the controller cycles 56 the printing system to the next sequential state of active IMEs, provided out of service IMEs do not prevent additional states from being executed.

In the event the printing system has not exceeded the predetermined number of printed sheets N, the printing job continues 54 to be executed without changing states until the number of printed sheets does exceed N.

After completion of the printing job, the controller starts the process again by receiving a print job 40.

Described hereto is a printing system and method of operation which includes two or more integrated IMEs, where the printing system operates with less than the total number of IMEs available to generate a specific throughput normally specified as prints per minute (ppm). By operating a printing system in this manner, the specified throughput of the system can be more reliably maintained where the throughput is specified as the throughput of the printing system operating less than all available IMEs.

For example, a 4 IME system as illustrated in FIG. 1 may include 4 IMEs each capable of 33.3 ppm. This 4 IME printing system is specified and advertised to the user as having a total throughput of approximately 100 ppm. By sequencing the 4 IMEs as previously described, the overall reliability is improved relative to a 3 IME printing system which includes 33.3 ppm IMEs. This improvement in overall printing system reliability is achieved because the 4 IME, 100 ppm printing system has excess capacity based on a spare IME. The spare IME enables the printing system to have an out-of-service IME without decreasing the ability of the printing system to produce 100 ppm based on operation of the three remaining IMEs.

In addition to an improvement in overall printing system reliability, the round-robin approach to the sequencing of IMEs contributes to more consistent image quality among the IMEs by maintaining an approximately equivalent number of performed printings associated with the IMEs.

It is to be understood that a round-robin approach to sequencing the printing system is only one example of a sequencing methodology.

Another exemplary embodiment of the disclosed method and system for sequencing a printing system includes an image sensor. The image sensor can be integrated in-line with the printing system as illustrated in FIG. 1, integrated within each IME or integrated somewhere else within the printing system. Alternatively, the image sensor may be external to the printing system and require an operator to manually feed a printed sheet to the image sensor. The function of the image sensor is to measure the print quality associated with the printing system and respective IMEs.

As a means for sequencing the printing system, the output of the image sensor is used by the printing system controller to associate a relative quality level with each IME.

As previously discussed, the relative quality of an IME is partly due to the number of printing cycles completed by the IME. Accordingly, a printing system can be selectively operated in a particular state which inactivates an IME producing relatively low quality prints as measured by the image sensor.

Notably, other variations of the printing system described hereto are within the scope of this disclosure. These variations include, but are not limited to, a variable cycle associated with the state cycle, a state sequencing cycle based on elapsed time which may or may not be associated with a component of the printing system, a printing system including two or more horizontally integrated IMEs, a printing system including two or more vertically integrated IMEs, a printing system including a combination of vertically and horizontally integrated IMEs, and a printing system including IMEs of different individual throughputs.

Figure 4:
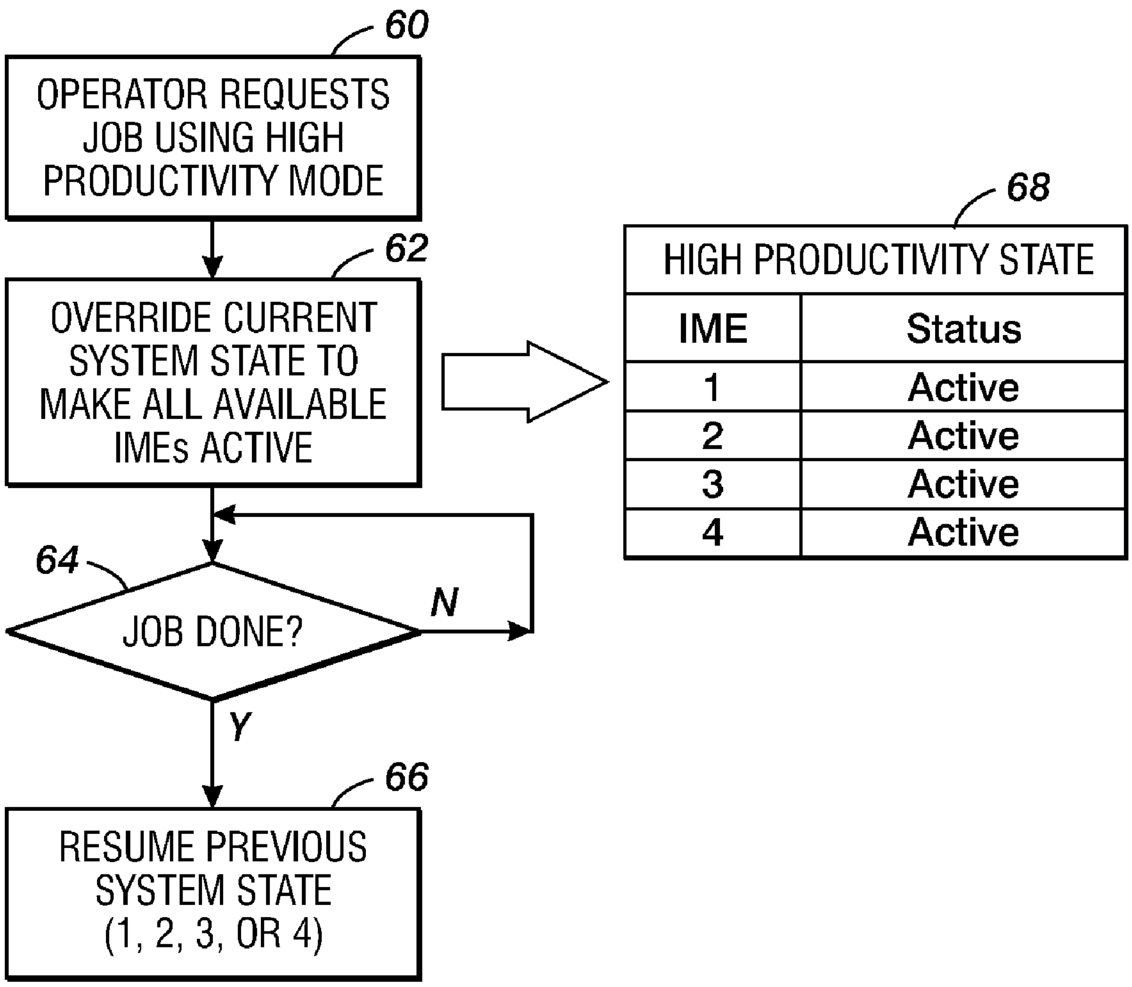
FIG. 4 is a flow chart illustrating an exemplary algorithm to control a printing system according to one exemplary embodiment of this disclosure.

With reference to FIG. 4, illustrated is a flow chart representing an algorithm to execute a high productivity mode associated with a printing system as described hereto. Specifically, the algorithm operates a 4 IME printing system as illustrated in FIG. 1 and provides a high productivity throughput by utilizing all IMEs associated with the printing system. In effect, the printing system is operating in a state outside the parameters of the specified and advertised throughput of the printing system.

In operation, the high productivity mode is selected 60 by a user while the printing system is operating in one of the sequential states 1, 2, 3, or 4.

After operator selection of the high productivity mode, the controller overrides 62 current system state execution and makes all available IMEs active and prints using the high productivity state 68.

As the printing system prints in the high productivity state, the controller monitors 64 the progress of the print job until completion.

After completion of the print job, the controller resumes 66 the system state being executed prior to the execution of the high productivity state.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of operating a printing system comprising two or more integrated image marking engines and a controller operatively connected to the two or more integrated image marking engines, the method comprising:

the controller operating the printing system with less than the total number of image marking engines (IMEs) to generate the maximum specified prints per minute (ppm) associated with the printing system, each image marking engine being controlled to be active for a first predetermined duty cycle and inactive for a second predetermined duty cycle, where the first and second duty cycles associated with each of the said two or more integrated image marking engines are substantially equal.

2. The method of operating a printing system according to claim 1, the method further comprising:

the controller sequencing the printing system through a series of system operating states, in a round-robin manner, wherein the number of system operating states is equal to the total number of integrated image marking engines and each system operating state inactivates a different image marking engine.

3. The method of operating a printing system according to claim 2, wherein the printing system comprises a first IME, a second IME, a first operating state and a second operating state, the method further comprising:

the controller operating the printing system in the first operating state for a first period of time $T_1$, wherein the first IME is active and the second IME is inactive; and the controller operating the printing system in the second operating state for a second period of time $T_2$, wherein the second IME is active and the first IME is inactive, wherein $T_1$ is substantially equal to $T_2$.

4. The method of operating a printing system according to claim 2, wherein the printing system comprises a first IME, a second IME, a first operating state and a second operating state, the method further comprising:

the controller operating the printing system in the first operating state until the printing system marks a predetermined number of sheets $N_1$, the controller operating the printing system in the second operating state until the printing system marks a predetermined number of sheets $N_2$, wherein $N_1$ is substantially equal to $N_2$.

5. The method of operating a printing system according to claim 2, wherein the printing system comprises a first IME, a second IME, a third IME, a first operating state, a second operating state and a third operating state, the method further comprising:

the controller operating the printing system in the first operating state until the printing system marks a predetermined number of sheets $N_1$, wherein the first IME and second IME are active, and the third IME is inactive;

the controller operating the printing system in the second operating state until the printing system marks a predetermined number of sheets $N_2$, wherein the first IME and third IME are active and the second IME is inactive; and the controller operating the printing system in the third operating state until the printing system marks a predetermined number of sheets $N_3$, wherein the second IME and third IME are active and the first IME is inactive;

wherein $N_1$, $N_2$ and $N_3$ are substantially equivalent.

6. The method of operating a printing system according to claim 2, wherein the printing system comprises a first IME, a second IME, a third IME, a fourth IME, a first operating state, a second operating state, a third operating state, and a fourth operating state, the method further comprising:

the controller operating the printing system in the first operating state until the printing system marks a predetermined number of sheets $N_1$, wherein the first IME, second IME and third IME are active and the fourth IME is inactive;

the controller operating the printing system in the second operating state until the printing system marks a predetermined number of sheets $N_2$, wherein the first IME, second IME and fourth IME are active and the third IME is inactive;

the controller operating the printing system in the third operating state until the printing system marks a predetermined number of sheets $N_3$, wherein the first IME, the third IME and fourth IME are active and the second IME is inactive, the controller operating the printing system in the fourth operating state until the printing system marks a predetermined number of sheets $N_4$, wherein the second IME, third IME and fourth IME are active and the first IME is inactive, wherein $N_1$, $N_2$, $N_3$ and $N_4$ are substantially equivalent.

7. The method of operating a printing system according to claim 1, wherein the printing system comprises a controller operatively connected to the two or more integrated image marking engines and the two or more integrated image marking engines are substantially equivalent, the method further comprising:

the controller controlling the respective active and inactive states of each IME to maintain substantially equivalent cumulative printing time among the IMEs.

8. The method of operating a printing system according to claim 1, further comprising:

the controller controlling the respective active and inactive states of the IMEs to control the image marking consistency of the printing system.

9. The method of operating a printing system according to claim 1, the method further comprising:

measuring the print quality of each IME; and selectively activating one or more IMEs and inactivating one or more IMEs based on the measured print quality of each IME.

10. The method of operating a printing system according to claim 1, further comprising:

the controller selectively controlling the printing system to activate all IMEs associated with the printing system to provide a high capacity print state.

11. A printing system comprising:

two or more integrated image marking engines; and a controller, wherein the controller is configured to execute a method comprising:

operating the printing system with less than the total number of image marking engines (IMEs) to generate the maximum specified prints per minute (ppm) associated with the printing system, each image marking engine being controlled to be active for a first predetermined duty cycle and inactive for a second predetermined duty cycle, where the first and second duty cycles associated with each of the said two or more integrated image marking engines are substantially equal.

12. The printing system according to claim 11, wherein the controller is configured to execute the method further comprising:

sequencing the printing system through a series of system operating states, in a round-robin manner, wherein the number of system operating states is equal to the total number of integrated image marking engines and each system operating state inactivates a different image marking engine.

13. The printing system according to claim 12, wherein the printing system comprises a first IME, a second IME, a first operating state and a second operating state, the controller configured to execute the method further comprising:

operating the printing system in the first operating state for a first period of time $T_1$, wherein the first IME is active and the second IME is inactive; and operating the printing system in the second operating state for a second period of time $T_2$, wherein the second IME is active and the first IME is inactive, wherein $T_1$ is substantially equal to $T_2$.

14. The printing system according to claim 12, wherein the printing system comprises a first IME, a second IME, a first operating state and a second operating state, the controller configured to execute the method further comprising:

operating the printing system in the first operating state until the printing system marks a predetermined number of sheets N1, wherein the first IME is active and the second IME is inactive; and operating the printing system in the second operating state until the printing system marks a predetermined number of sheets N2, wherein the second IME is active and the first IME is inactive, wherein $N_1$ is substantially equal to $N_2$.

15. The printing system according to claim 12, wherein the printing system comprises a first IME, a second IME, a third IME, a first operating state, a second operating state and a third operating state, the controller configured to execute the method further comprising:

operating the printing system in the first operating state until the printing system marks a predetermined number of sheets $N_1$, wherein the first IME and second IME are active, and the third IME is inactive;

operating the printing system in the second operating state until the printing system marks a predetermined number of sheets $N_2$, wherein the first IME and third IME are active and the second IME is inactive; and operating the printing system in the third operating state until the printing system marks a predetermined number of sheets $N_3$, wherein the second IME and third IME are active and the first IME is inactive;

wherein $N_1$, $N_2$ and $N_3$ are substantially equivalent.

16. The printing system according to claim 12, wherein the printing system comprises a first IME, a second IME, a third IME, a fourth IME, a first operating state, a second operating state, a third operating state and a fourth operating state, the controller configured to execute the method further comprising:

operating the printing system in the first operating state until the printing system marks a predetermined number of sheets $N_1$, wherein the first IME, second IME and third IME are active and the fourth IME is inactive;

operating the printing system in the second operating state until the printing system marks a predetermined number of sheets $N_2$, wherein the first IME, second IME and fourth IME are active and the third IME is inactive;

operating the printing system in the third operating state until the printing system marks a predetermined number of sheets $N_3$, wherein the first IME, the third IME and fourth IME are active and the second IME is inactive, operating the printing system in the fourth operating state until the printing system marks a predetermined number of sheets $N_4$, wherein the second IME, third IME and fourth IME are active and the first IME is inactive, wherein $N_1$, $N_2$, $N_3$ and $N_4$ are substantially equivalent.

17. The printing system according to claim 11, wherein the controller is configured to control the respective active and inactive states of each IME to maintain substantially equivalent cumulative printing time among the IMEs.

18. The printing system according to claim 11, wherein the controller is configured to control the respective active and inactive states of the IMEs to control the image marking consistency of the printing system.

19. The printing system according to claim 11, further comprising:

one or more image monitoring sensors to measure the print quality associated with each IME, wherein the one or more image monitoring sensors are operationally connected to the controller and the controller is configured to selectively activate one or more IMEs and inactive one or more IMEs based on the measured print quality of each IME.

20. The printing system according to claim 11, wherein the controller is configured to selectively activate all IMEs associated with the printing system to provide a high capacity print state.

21. A xerographic imaging system comprising:

two or more image marking engines;

a media sheet feeder module;

a media sheet stacker module;

one or more media path highways operatively connected to the two or more image marking engines, the media sheet feeder module and the media sheet stacker module; and a controller, wherein the controller is configured to execute a method comprising:

operating the printing system with less than the total number of image marking engines (IMEs) to generate the maximum specified prints per minute (ppm) associated with the printing system, each image marking engine being controlled to be active for a first predetermined duty cycle and inactive for a second predetermined duty cycle, where the first and second duty cycles associated with each of the said two or more integrated image marking engines are substantially equal.

22. The xerographic imaging system according to claim 21, wherein the controller is configured to execute the method further comprising:

sequencing the printing system through a series of system operating states, in a round-robin manner, wherein the number of system operating states is equal to the total number of integrated image marking engines and each system operating state inactivates a different image marking engine.

* * * * *